(12) United States Patent
Larsen et al.

(10) Patent No.: US 9,482,290 B2
(45) Date of Patent: Nov. 1, 2016

(54) TRANSMISSION GEAR ENGAGEMENT MECHANISM AND METHOD OF OPERATION

(75) Inventors: Herbert A. Larsen, Cedar Falls, IA (US); Raymond Donald Meek, Waverly, IA (US)

(73) Assignee: Deere & Company, Moline, IL (US)

( * ) Notice: Subject to any disclaimer, the term of this patent is extended or adjusted under 35 U.S.C. 154(b) by 342 days.

(21) Appl. No.: 13/000,036

(22) PCT Filed: Jul. 3, 2008

(86) PCT No.: PCT/US2008/008253
§ 371 (c)(1),
(2), (4) Date: Jun. 23, 2011

(87) PCT Pub. No.: WO2010/002365
PCT Pub. Date: Jan. 7, 2010

(65) Prior Publication Data
US 2011/0259695 A1    Oct. 27, 2011

(51) Int. Cl.
*F16H 59/00*      (2006.01)
*F16D 25/08*      (2006.01)
*F16D 25/061*     (2006.01)

(52) U.S. Cl.
CPC .......... *F16D 25/082* (2013.01); *F16D 25/061* (2013.01)

(58) Field of Classification Search
USPC .................. 74/335, 655, 718, 721, 730.1
See application file for complete search history.

(56) References Cited

U.S. PATENT DOCUMENTS

| | | | |
|---|---|---|---|
| 2,394,580 A | | 2/1946 | Banker |
| 2,427,652 A | * | 9/1947 | Banker ............... F16H 61/0269 192/3.57 |
| 2,428,336 A | * | 9/1947 | Munschauer ......... F16D 25/061 192/85.18 |
| 2,507,137 A | | 5/1950 | Banker |
| 2,664,765 A | * | 1/1954 | Kelbel .................... F16D 67/00 475/50 |
| 2,685,210 A | * | 8/1954 | Heisler ...................... F16H 3/16 74/333 |
| 2,803,149 A | * | 8/1957 | Pringle .................. F16H 48/08 192/85.18 |
| 2,870,642 A | * | 1/1959 | Randol ................... F16D 21/06 192/21.5 |
| 3,218,888 A | * | 11/1965 | McIninch ................ F16H 3/06 74/333 |
| 3,254,541 A | * | 6/1966 | Schou ..................... F16H 3/093 74/360 |

(Continued)

OTHER PUBLICATIONS

State Intellectual Property Office of the People's Republic of China, Chinese Office Action in Application No. 200880129734.2 mailed Nov. 5, 2012.

*Primary Examiner* — William Kelleher
*Assistant Examiner* — Zakaria Elahmadi
(74) *Attorney, Agent, or Firm* — Lorenz & Kopf, LLP

(57) ABSTRACT

A transmission (12) for a vehicle (10) includes a gear shaft (40) having a fluid passage (106), and a gear (42) having a first bore mounted to the gear shaft (40). The gear has a first axial face (74) with a plurality of teeth (76), and a first undercut (78) at each of the first bore and the first axial face. A shift collar (64) has a second bore (88) mounted to the gear shaft (40). The second bore (88) is axially movable and rotationally fixed relative to the gear shaft (40). The shift collar (64) has a second axial face (92) with a plurality of teeth (94), and a second undercut (98) at each of the second bore (88) and the second axial face (92). The teeth (94) of the second axial face (92) are enmeshable with the teeth (76) of the first axial face (74). An annular piston (66) is slidably mounted to the gear shaft (40) and positioned within each of the first undercut (78) and the second undercut (98). The annular piston (66) is configured to move the shift collar (64) away from the gear using pressurized fluid in the fluid passage (106).

24 Claims, 4 Drawing Sheets

(56) References Cited

U.S. PATENT DOCUMENTS

| | | | | |
|---|---|---|---|---|
| 3,397,620 A * | 8/1968 | Skelton et al. | ................... | 92/24 |
| 3,464,277 A * | 9/1969 | Longshore | ............. | F16H 3/001 |
| | | | | 74/15.4 |
| 3,498,150 A * | 3/1970 | Funk | ....................... | F16H 3/093 |
| | | | | 74/331 |
| 3,613,480 A * | 10/1971 | Shull | ...................... | F16H 61/14 |
| | | | | 192/3.31 |
| 3,954,028 A * | 5/1976 | Windish | .................. | F16H 3/663 |
| | | | | 475/286 |
| 3,973,450 A * | 8/1976 | Shealy | .................... | F16H 48/08 |
| | | | | 475/119 |
| 4,149,428 A * | 4/1979 | Mueller | ............. | F16H 63/3023 |
| | | | | 74/335 |
| 4,249,429 A * | 2/1981 | Denning | ................ | F16H 48/08 |
| | | | | 475/241 |
| 4,261,216 A * | 4/1981 | Braun | .................. | F16H 3/0915 |
| | | | | 74/335 |
| 4,293,061 A * | 10/1981 | Brown | .................. | B60B 37/00 |
| | | | | 192/69.4 |
| 4,489,621 A * | 12/1984 | McIntosh | ........................ | 74/355 |
| 4,614,126 A * | 9/1986 | Edelen et al. | ................... | 74/333 |
| 4,722,240 A * | 2/1988 | Frederick | ........... | F16H 57/0031 |
| | | | | 384/420 |
| 4,867,291 A * | 9/1989 | Holman | ................ | B60K 17/26 |
| | | | | 192/219.3 |
| 4,960,192 A * | 10/1990 | Kurihara | ........... | B60K 17/3515 |
| | | | | 180/247 |
| 5,309,782 A * | 5/1994 | Seaman | .......................... | 74/359 |
| 5,353,890 A * | 10/1994 | Clohessy | ........... | B60K 17/3515 |
| | | | | 180/247 |
| 5,386,898 A * | 2/1995 | Weilant | .................. | B60K 23/08 |
| | | | | 180/247 |
| 5,695,030 A * | 12/1997 | Medcalf, Jr. | ........... | B60T 1/005 |
| | | | | 188/170 |
| 5,890,989 A * | 4/1999 | Yamazaki | ............... | B60K 23/08 |
| | | | | 180/247 |
| 6,000,294 A * | 12/1999 | Jackson et al. | ................. | 74/335 |
| 6,112,873 A | 9/2000 | Prasse et al. | | |
| 6,422,128 B1 * | 7/2002 | Ahn | .................... | F04B 27/0878 |
| | | | | 92/165 PR |
| 6,540,634 B2 * | 4/2003 | Thompson | ............. | F16H 48/08 |
| | | | | 192/85.48 |
| 6,918,851 B2 | 7/2005 | Ziech et al. | | |
| 7,211,017 B2 * | 5/2007 | Green | .................... | B60K 17/16 |
| | | | | 192/85.18 |
| 7,331,894 B2 * | 2/2008 | Sowul | .................. | F16D 25/061 |
| | | | | 192/69.91 |
| 7,430,936 B2 * | 10/2008 | Petzold | ................... | F16H 61/28 |
| | | | | 192/109 F |
| 7,524,260 B2 * | 4/2009 | Correia et al. | ................. | 475/300 |
| 7,757,576 B1 * | 7/2010 | Einboeck | ........................ | 74/335 |
| 8,234,956 B2 * | 8/2012 | Love | ...................... | F16D 11/14 |
| | | | | 74/718 |
| 2008/0085803 A1* | 4/2008 | Claussen | ................ | B60K 17/36 |
| | | | | 475/220 |
| 2009/0301241 A1* | 12/2009 | Martin et al. | ................... | 74/335 |
| 2010/0162849 A1* | 7/2010 | Love | ...................... | F16D 11/14 |
| | | | | 74/718 |
| 2012/0018275 A1* | 1/2012 | Voth | ...................... | B60K 23/08 |
| | | | | 192/85.01 |

* cited by examiner

TRANSMISSION GEAR ENGAGEMENT MECHANISM AND METHOD OF OPERATION

FIELD OF THE INVENTION

The present invention relates to work machines, and, more particularly, to transmissions used in such work machines.

BACKGROUND OF THE INVENTION

A work machine such as an agricultural tractor may be driven with motive force taking several different forms, such as a rear wheel drive, four wheel drive (4WD), mechanical front wheel drive (MFWD), track-type drive, etc. In the case of an MFWD equipped tractor, the front wheel drive typically is not full time, and an electronic switch in the operator's station is used to switch between rear wheel drive and MFWD mode.

An MFWD tractor may include an internal combustion (IC) engine which provides input power to a transmission, which in turn is coupled with and drives the rear axles through a rear end differential. The transmission may also include an output shaft, typically facing in the forward direction, which connects via a drive shaft or the like with the MFWD at the front end of the tractor. The drive shaft output from the transmission may be clutched to selectively provide output power from the transmission to the MFWD. Conventional clutch designs are effective for engagement and disengagement of the drive shaft, but tend to be relatively complex in design.

An example of a clutch arrangement used in an MFWD equipped tractor is disclosed in U.S. Pat. No. 6,364,045, which is presently purchased by the assignee of the present invention for use in the John Deere 5000 series tractors. Referring to FIG. 2, a cylinder 55 is interposed between a clutch member 52 and a drive gear 37. The cylinder 55 includes a generally U-shaped cutout in which a piston 57 is slidably positioned. Hydraulic pressure is transmitted through the shaft 36, then at a 45 degree angle through the back wall of cylinder 55, before finally acting on piston 57. The number of components and component configuration adds to the complexity and cost of the clutch design.

What is needed in the art is a clutch for a gear arrangement in a transmission which is simple, economical and reliable.

SUMMARY OF THE INVENTION

The invention in one form is directed to a transmission for a vehicle, including a gear shaft having a fluid passage, and a gear having a first bore mounted to the gear shaft. The gear has a first axial face with a plurality of teeth, and a first undercut at each of the first bore and the first axial face. A shift collar has a second bore mounted to the gear shaft. The second bore is axially movable and rotationally fixed relative to the gear shaft. The shift collar has a second axial face with a plurality of teeth, and a second undercut at each of the second bore and the second axial face. The teeth of the second axial face are enmeshable with the teeth of the first axial face. An annular piston is slidably mounted to the gear shaft and positioned within each of the first undercut and the second undercut. The annular piston is configured to move the shift collar away from the gear using pressurized fluid in the fluid passage.

The invention in another form is directed to a method of operating a transmission as described in the preceding paragraph, including the steps of: biasing the shift collar against the gear using a spring; and disengaging the shift collar from the gear by applying a pressurized fluid to the fluid passage and thereby moving the shift collar away from the gear.

DETAILED DESCRIPTION OF THE INVENTION

Figure 1:
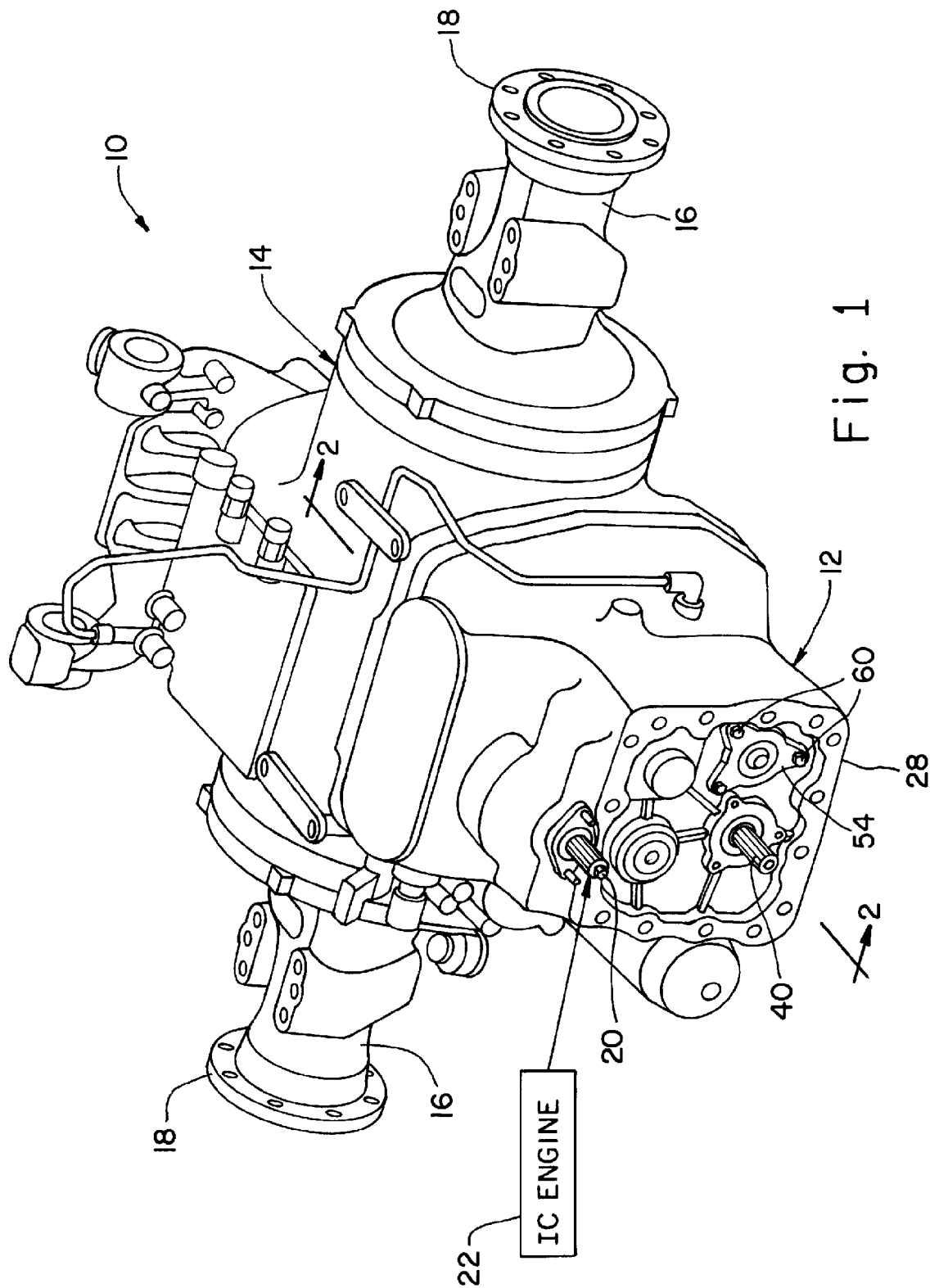
FIG. 1 is a perspective view of an embodiment of a transmission of the present invention used in an agricultural tractor.
Figure 2:
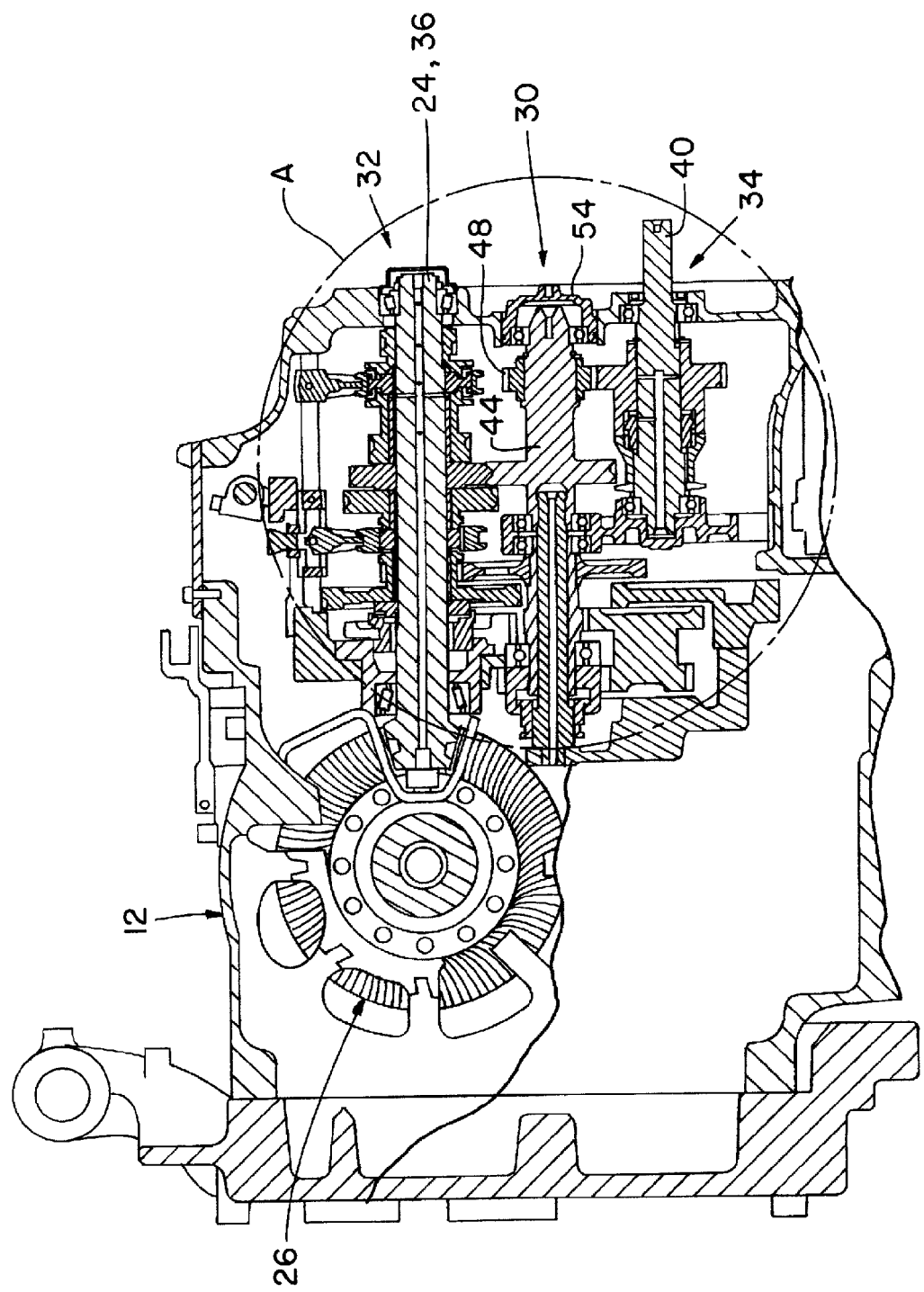
FIG. 2 is a side, sectional view through the transmission shown in FIG. 1, taken along line 2-2.

Referring now to the drawings, and more particularly to FIGS. 1 and 2, there is shown a portion of a work machine 10 in the form of an agricultural tractor, particularly the rear end drive train of the tractor. Although shown as an agricultural tractor, it is possible that work machine 10 could be in the form of a different type of work machine, such as a construction tractor or forestry machine.

Tractor 10 includes a transmission 12 which is coupled with a rear end differential 14, which in turn drives a pair of rear axels 16. Each rear axel 16 includes an outboard hub 18 to which a respective rear drive wheel (not shown) is mounted.

Transmission 12 includes a driven shaft 20 which is mechanically coupled with and receives rotational input power from IC engine 22, shown schematically in FIG. 1. Driven shaft 20 transfers rotational power via appropriate gearing to differential drive shaft 24, which in turn extends from the rear of and provides rotational input power to rear end differential gear set 26 (see FIG. 2).

Figure 3:
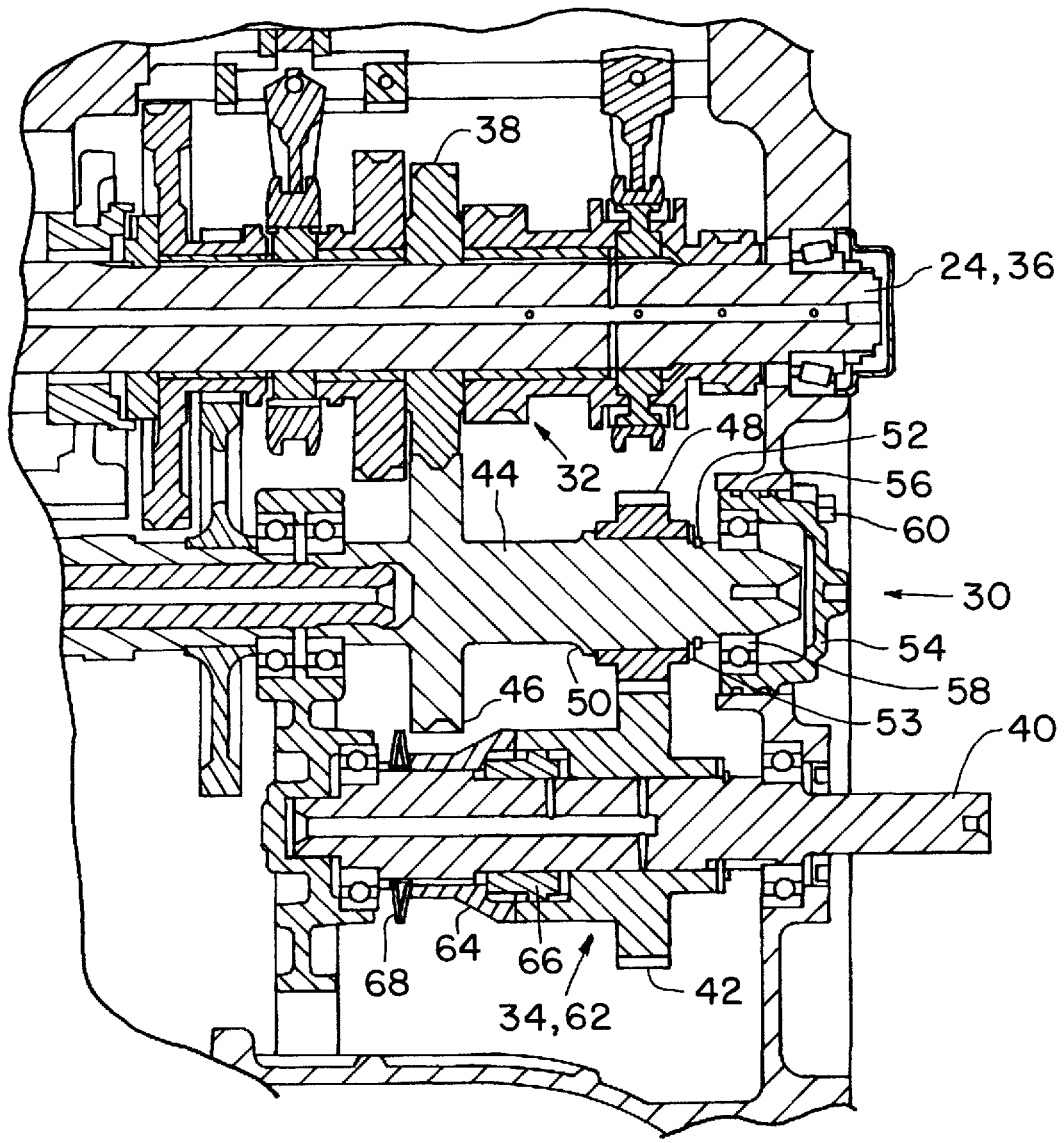
FIG. 3 is an enlarged view of detail A shown in FIG. 2.

Driven shaft 20 extends through and is rotatably carried by housing 28, which likewise houses and rotatably carries a number of other components. Also positioned within and carried by housing 28 is an idler arrangement 30 which mechanically interconnects between a power input 32 and a power output 34. Referring to FIGS. 2 and 3, power input 32 includes an input shaft 36 and an input gear 38 carried by input shaft 36. In the embodiment shown, input shaft 36 is in fact the differential drive shaft 24, but could be a different rotatable drive shaft providing input power to idler arrangement 30. Input shaft 36 receives input power from driven shaft 20 coupled with IC engine 22.

The terms power input 32 and power output 34 are used relative to idler arrangement 30. That is, power input 32 provides input power to idler arrangement 30, and power output 34 receives and provides power output from idler arrangement 30.

Idler arrangement 30 (FIGS. 3 and 4) includes an idler shaft 44, driven gear 46 and drive gear 48. Driven gear 46 is rigidly fixed to idler shaft 44 and rotates therewith during operation. Drive gear 48 has an inside diameter which is splined to the outside diameter of idler shaft 44 when in an installed position. Drive gear 48 abuts against a shoulder 50 on idler shaft 44 for retention in one axial direction, and is retained by a snap ring 52 in the other axial direction (with a thrust washer 53 between snap ring 52 and drive gear 48).

An access cover 54 forms part of housing 28, and fits within an access opening 56 formed in housing 28. Access cover 54 also defines a bearing support which supports a bearing 62, which in turn has an inner race which rotatably carries an outboard end of idler shaft 44. Access cover 54 is fastened to housing 28 using three bolts 60, or other suitable fastening technique.

Power output 34 similarly includes an output shaft 40 and an output gear 42 carried by output shaft 40. In the embodiment shown, output shaft 40 extends through housing 28 and provides rotational output power to the MFWD at the front axle of tractor 10. Output gear 42 is clutched to output shaft 40 so that output gear 42 positively rotates with output shaft 40 when the MFWD is engaged by actuation of a switch (not shown) in the operator's station.

Figure 4:
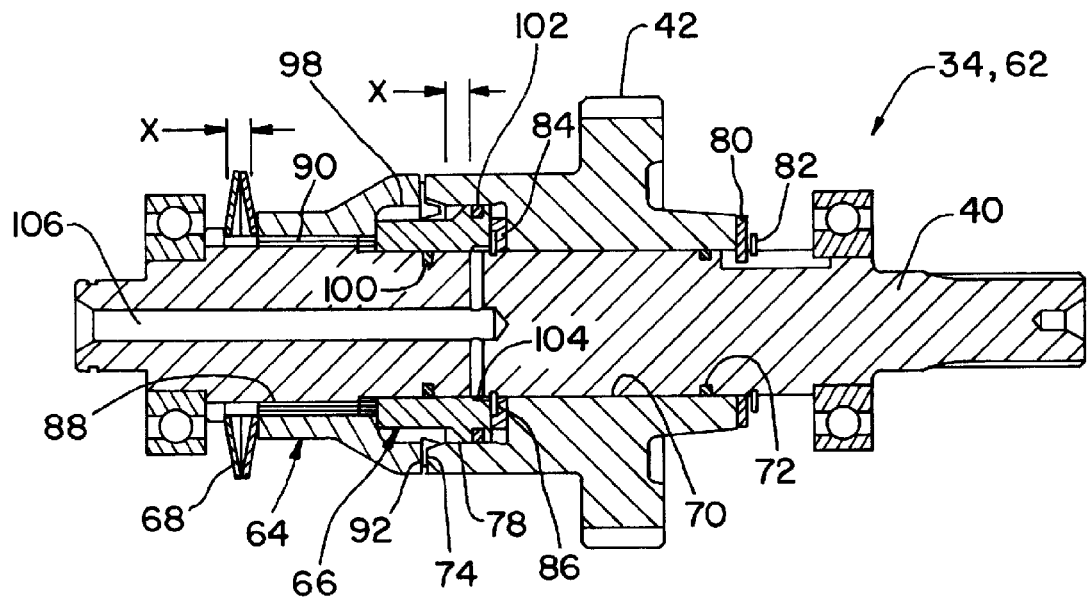
FIG. 4 is a side sectional view through the clutch shown in FIGS. 2 and 3.
Figure 5:
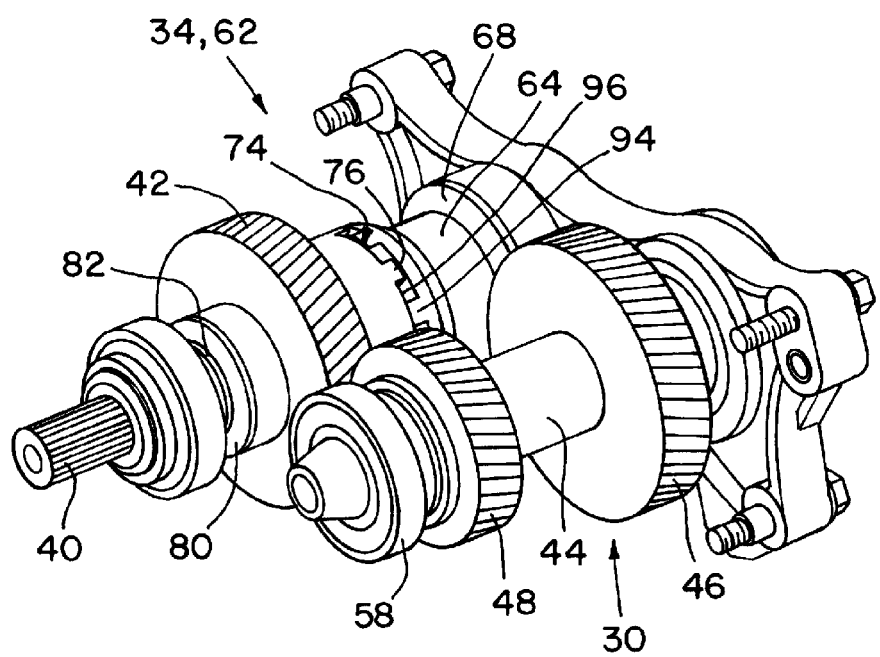
FIG. 5 is a perspective view of the clutch and idler arrangement shown in FIGS. 2 and 3.

More particularly, a clutch arrangement 62 generally includes output gear 42, shift collar 64, annular piston 66 and spring 68 (FIGS. 3-5). Output gear 42 includes a first bore 70 which is mounted to gear shaft 40. At least one seal 72 may be carried by output gear 42 and/or output shaft 40 to completely seal between or only allow a limited amount of flow between output gear 42 and output shaft 40. In the embodiment shown, seal 72 is carried by output shaft 40 and allows only a small amount of hydraulic fluid to flow therepast for proper lubrication.

Output gear 42 has a first axial face 74 with a plurality of teeth 76. In the embodiment shown, teeth 76 are rectangular shaped teeth but could be formed with a different shape. An annular shaped first undercut 78 is formed at the inside diameter of output gear 42 adjacent to first axial face 74.

Output gear 42 is rotatable about output shaft 40, but is retained in an axial direction relative to output shaft 40. To that end, a first thrust washer 80 and first snap ring 82 is carried by output shaft 40 at a side of output gear 42 which is opposite from shift collar 64. Additionally, a second thrust washer 84 and a second snap ring 86 are carried by output shaft 40 on a side of output gear 42 which is adjacent to annular piston 66. Second thrust washer 84 and second snap ring 86 are each positioned within first undercut 78 of output gear 42. Second snap ring 86 is positioned within an axially facing notch formed in second thrust washer 84, such that second snap ring 86 and second thrust washer 84 lie generally coplanar relative to an end of annular piston 66.

Shift collar 64 includes a second bore 88 mounted to output shaft 40. Second bore 88 is axially movable and rotationally fixed relative to output shaft 40. In the embodiment shown, second bore 88 and the outside diameter of output shaft 40 are splined to each other (indicated at reference number 90) so that only a single degree of motion is allowed in the axial direction.

Shift collar 64 includes a second axial face 92 with a plurality of teeth 94. Teeth 94 also are shown with a rectangular shape which is sized to enmesh with teeth 76 at the axial end of output gear 42. Teeth 76 and teeth 94 each have a notch 96 therebetween which is sized to provide a substantial clearance for easy engagement between shift collar 64 and output gear 42.

Shift collar 64 also includes a second undercut 98 which is formed in second bore 88 adjacent to second axial face 92.

Annular piston 66 is slidably mounted to output shaft 40, and is positioned within the annular recess defined by each of first undercut 78 and second undercut 98. Annular piston 66 is sealed with each of output shaft 40 and output gear 42. A seal 100 carried by output shaft 40 is positioned at the inside diameter of annular piston 66, and a seal 102 is carried in an annular groove at the outside diameter of annular piston 66.

Annular piston 66 additionally includes an annular groove 104 which is formed in the inside diameter adjacent to output gear 42. Annular groove 104 fluidly interconnects a fluid passage 106 formed in output shaft 40 with an end of annular piston 66 adjacent to output gear 42.

Spring 68 is carried by output shaft 40 on a side of shift collar 64 which is opposite from output gear 42. Spring 68 biases shift collar 64 toward output gear 42 such that teeth 76 and 94 are enmeshed with each other during an MFWD mode. In the embodiment shown, spring 68 is configured as a disk spring which is compressible a fixed distance X upon movement of shift collar 64 away from output gear 42.

During operation of work machine 10 in an MFWD mode, there is no pressurized fluid in fluid passage 106 and spring 68 mechanically biases shift collar 64 into engagement with output gear 42 such that teeth 76 and 94 are enmeshed with each other. When an operator disengages the MFWD switch, pressurized hydraulic fluid flows through fluid passage 106 and annular groove 104 to act against the end face of annular piston 66 adjacent to output gear 42. The pressurized fluid moves annular piston 66 away from output gear 42, which in turn moves shift collar 64 in an axial direction away from output gear 42. The extent to which shift collar 64 is moved is limited by the fixed distance X of spring 68. As annular piston 66 moves through this same distance X, seal 102 remains sealed with the inside diameter of first undercut 78. Teeth 76 and 94 disengage and output gear 42 is free to rotate about output shaft 40, thereby not driving output shaft 40 and allowing operation of work machine 10 in a rear wheel drive mode.

Having described the preferred embodiment, it will become apparent that various modifications can be made without departing from the scope of the invention as defined in the accompanying claims.

The invention claimed is:

1. A transmission for a vehicle, comprising:
a gear shaft having an internal fluid passage;
a gear having a first bore carried about said gear shaft such that said gear circumferentially surrounds said gear shaft and is rotatable relative to said gear shaft, said gear having a first axial face with a plurality of teeth, and a first undercut at each of said first bore and said first axial face, said first undercut at least partly defining a first annular cavity circumferentially surrounding said gear shaft and extending radially from said gear shaft to a portion of said gear;
a shift collar having a second bore carried about said gear shaft, said second bore circumferentially surrounds said gear shaft and being axially movable and rotationally fixed relative to said gear shaft such that said shift collar rotates with said gear shaft, said shift collar having a second axial face with a plurality of teeth, and a second undercut at each of said second bore and said second axial face, said second undercut at least partly defining a second annular cavity circumferentially surrounding said gear shaft and extending radially from said gear shaft to a portion of said shift collar, said teeth of said second axial face being enmeshable with said teeth of said first axial face to cause said gear to rotate with said shift collar; and
an annular piston slidably carried about said gear shaft such that said annular piston circumferentially surrounds said gear shaft and positioned within each of said first annular cavity and said second annular cavity such that said annular piston is at least partly disposed radially between said gear shaft and each of said gear and said shift collar, said annular piston moving said shift collar away from said gear when said annular piston is subjected to pressurized fluid from said fluid passage of said gear shaft entering at least one of said first bore and said second bore.

2. The transmission of claim 1, including a spring carried by said gear shaft on a side of said shift collar opposite said gear, said spring biasing said shift collar toward said gear.

3. The transmission of claim 2, wherein said spring is compressible a fixed distance, and said annular piston can move said shift collar approximately said fixed distance, thereby disengaging said shift collar from said gear.

4. The transmission of claim 2, wherein said spring is a disk spring.

5. The transmission of claim 1, wherein said shift collar is splined to said gear shaft.

6. The transmission of claim 1, wherein said annular piston includes an annular groove fluidly interconnecting said fluid passage with an end of said annular piston adjacent said gear.

7. The transmission of claim 1, wherein said teeth on each of said gear and said shift collar are rectangular shaped teeth.

8. The transmission of claim 7, wherein said teeth on each of said gear and said shift collar are separated by notches providing substantial clearance and easy engagement between said gear and said shift collar.

9. The transmission of claim 1, including at least one seal between said annular piston and each of said gear shaft and said first undercut in said gear.

10. The transmission of claim 1, including at least one seal between said gear and said gear shaft.

11. The transmission of claim 1, including a first thrust washer and a first snap ring carried by said gear shaft on a side of said gear opposite said shift collar.

12. The transmission of claim 1, including a second thrust washer and a second snap ring carried by said gear shaft on a side of said gear adjacent said annular piston, said second thrust washer and said second snap ring positioned within said first undercut in said gear.

13. The transmission of claim 1, wherein said vehicle comprises a work machine.

14. A work machine, comprising:
an engine; and
a transmission coupled with said engine, said transmission including:
a gear shaft having an internal fluid passage;
a gear having a first bore carried about said gear shaft such that said gear circumferentially surrounds said gear shaft and is rotatable relative to said gear shaft, said gear having a first axial face with a plurality of teeth, and a first undercut defining a first annular cavity circumferentially surrounding said gear shaft and extending from said first axial face, radially between said gear shaft and a portion of said gear, at least partly along said first bore;
a shift collar having a second bore carried about said gear shaft, said second bore circumferentially surrounding said gear shaft and being axially movable and rotationally fixed relative to said gear shaft such that said shift collar rotates with said gear shaft, said shift collar having a second axial face with a plurality of teeth, and a second undercut defining a second annular cavity circumferentially surrounding said gear shaft and extending from said second axial face, radially between said gear shaft and a portion of said shift collar, at least partly along said second bore, said teeth of said second axial face being enmeshable with said teeth of said first axial face to cause said gear to rotate with said shift collar; and
an annular piston carried about said gear shaft such that said annular piston circumferentially surrounds said gear shaft and positioned within each of said first annular cavity and said second annular cavity such that said annular piston is at least partly disposed radially between said gear shaft and each of said gear and said shift collar, said annular piston moving said shift collar away from said gear when said annular piston is subjected to pressurized fluid from said fluid passage of said gear shaft entering at least one of said first bore and said second bore.

15. The work machine of claim 14, including a spring carried by said gear shaft on a side of said shift collar opposite said gear, said spring biasing said shift collar toward said gear.

16. The work machine of claim 15, wherein said spring is compressible a fixed distance, and said annular piston can move said shift collar approximately said fixed distance, thereby disengaging said shift collar from said gear.

17. The work machine of claim 15, wherein said spring is a disk spring.

18. The work machine of claim 14, wherein said shift collar is splined to said gear shaft.

19. The work machine of claim 14, wherein said annular piston includes an annular groove fluidly interconnecting said fluid passage with an end of said annular piston adjacent said gear.

20. The work machine of claim 14, wherein said teeth on each of said gear and said shift collar are rectangular shaped teeth.

21. The work machine of claim 20, wherein said teeth on each of said gear and said shift collar are separated by notches providing substantial clearance and easy engagement between said gear and said shift collar.

22. The work machine of claim 14, including at least one seal between said annular piston and each of said gear shaft and said first undercut in said gear, and further including at least one seal between said gear and said gear shaft.

23. A method of operating a transmission in a vehicle, comprising the steps of:
providing a transmission including:
a gear shaft having an internal fluid passage;
a gear having a first bore carried about said gear shaft such that said gear circumferentially surrounds said gear shaft, said gear having a first axial face with a plurality of teeth, and a first undercut at each of said first bore and said first axial face defining a first annular cavity circumferentially surrounding said gear shaft and extending radially between said gear shaft and said gear;
a shift collar having a second bore carried about said gear shaft, said second bore circumferentially surrounds said gear shaft and being axially movable and rotationally fixed relative to said gear shaft, said gear having a second axial face with a plurality of teeth, and a second undercut at each of said second bore and said second axial face defining a second annular cavity circumferentially surrounding said gear shaft and extending radially between said gear shaft and said shift collar, said teeth of said second axial face being enmeshable with said teeth of said first axial face to cause said gear to rotate with said shift collar;
an annular piston carried about said gear shaft such that said annular piston circumferentially surrounds said gear shaft and positioned within each of said first annular cavity and said second annular cavity such that said annular piston is at least partly disposed radially between said gear shaft and each of said gear and said shift collar, said annular piston slidable on said gear shaft to move said shift collar away from said gear using pressurized fluid in said fluid passage of said gear shaft entering at least one of said first bore and said second bore; and a spring carried by said gear shaft on a side of said shift collar opposite said gear;

biasing said shift collar against said gear using said spring; and disengaging said shift collar from said gear by applying a pressurized fluid to said fluid passage and thereby moving said shift collar away from said gear.

24. The method of operating a transmission of claim 23, including the step of engaging said shift collar with said gear by decreasing pressure of the fluid to allow the spring to bias said shift collar against said gear.

* * * * *